United States Patent
Khelghatian et al.

[15] 3,663,377

[45] May 16, 1972

[54] ELECTROPLATABLE POLYOLEFINS

[72] Inventors: Habet M. Khelghatian; Wassily Poppe, both of P.O. Box 426, Springfield, Pa. 19061

[22] Filed: May 8, 1970

[21] Appl. No.: 33,178

Related U.S. Application Data

[63] Continuation of Ser. No. 802,645, Feb. 26, 1969, abandoned.

[52] U.S. Cl. ............................204/30, 204/20, 204/38 B, 204/38 E
[51] Int. Cl. .................................................C23b 5/60
[58] Field of Search ..........................204/20, 22, 30, 38

[56] References Cited

UNITED STATES PATENTS 3,556,955  1/1971  Ancker et al. ..........................204/30

FOREIGN PATENTS OR APPLICATIONS 907,016  9/1962  Great Britain .......................260/94.9

*Primary Examiner*—F. C. Edmundson
*Attorney*—Roger V. N. Powelson, Arthur G. Gilkes and Charles E. Feeny

[57] ABSTRACT

In the art of electroplating polyolefins, adhesion of the plated metal to the polyolefin is enhanced by incorporating into the polyolefin from 0.1 to 2 percent by weight of at least one surface active agent such as a nonionic, cationic or anionic surfactant.

9 Claims, No Drawings

ELECTROPLATABLE POLYOLEFINS

RELATED APPLICATIONS

This application is a continuation-in-part of U.S. Pat. application Ser. No. 637,316, filed May 3, 1967, and now abandoned.

DESCRIPTION OF THE INVENTION

The present invention relates to polyolefin compositions and more particularly to polyolefin compositions which are suitable for electroplating. In another embodiment, the present invention relates to the modification of polyolefins to make surfaces of articles prepared from such polyolefin compositions improved in their utility and electroplating.

The problem of causing ink, paint or other types of coating to adhere to a polyolefin surface is well known. Various methods and means have been suggested for improving the adhesion of inks, paints, metals and similar coating materials to plastic surfaces. In general, the approach to solving the problem of adhesion to a polyolefin surface has been to modify the surface of the finished article by an oxidizing treatment of some kind. Although some of the methods based on surface oxidation of a polypropylene have been proven to be satisfactory for imparting printability to a polyolefin surface such treatment, in general, has found only limited success in causing a superior bond between the surface of the polyolefin article and metal plated onto the surface. The electroplating of a polyolefin article in which the metal plate, having thicknesses in the range of 1 mil, is tightly bonded to the polyolefin substrate constitutes, however, a highly desirable goal in view of the more recently developed polyolefins which can be considered engineering plastics and thus substitutes for zinc die casts or other metals. An electroplated metal coating having good adhesion to the plastic substrate, furthermore, improves the structural properties of the plastic thereby enhancing its use as a substitute for metals. The advantages of using polyolefins in such applications include lower cost of materials, cheaper tooling and tool maintenance, lower finishing costs in buffing and polishing and lower shipping cost. The use of polyolefins, furthermore, allows greater versatility of product design and gives a more corrosion resistant end product. In the engineering and aerospace fields, the substitution of plastics for metal can result in weight savings which is always of vital importance. Increased adhesion between the metal plate and the polyolefin substrate causes improved physical properties such as flexural modulus, impact strength and temperature deflection.

It is, therefore, an object of the present invention to provide a novel polyolefin composition.

It is another object of the present invention to provide novel polyolefin compositions exhibiting increased adhesion to metals when employed in conventional electroplating processes for nonconducting surfaces.

It is a further object of the present invention to provide metal plated polyolefin articles exhibiting high bond strength between the polyolefin substrate and the metal plate.

It is still another object of the present invention to provide a process for electroplating polyolefin particles.

Other objects will become apparent from the following description and claims.

The polyolefin compositions of the present invention comprise polyolefins containing from 0.1 to 2 percent and preferably from 0.25 to 1 percent by weight of the polyolefin of a compatible surfactant thermally stable at the fabrication temperatures of the polyolefin. In a preferred embodiment, the polyolefin composition contains in addition to the compatible surfactant a compatible sulfur compound in a concentration range of 0.25 to 1.5 percent and preferably 0.3 to 1.0 percent. The increase of bond strength obtained by using the combination of the compatible detergent and compatible sulfur compound is significantly greater than obtained with each additive alone.

The term "compatible," employed to characterize the additives in the compositions of the present invention, is meant to define a material which can be uniformly distributed throughout the polyolefin composition within the concentration ranges indicated and on distribution results in a single phase composition so far as determinable by visual examination. Preferably, the additive is dispersible in the polyolefin on a molecular scale so that the composition appears homogeneous even under microscopic examination.

Since it is believed that the action of the surfactant additive is physical in nature rather than chemical, the specific chemical nature of the additive is not critical insofar as its operability in improving the bond strength of the metal to the polyolefin substrate is concerned. The surface active agents may be nonionic, cationic, anionic or mixtures thereof. Particularly preferred surface active agents are the nonionic surfactants. The nonionic surface active agents preferably employed as additives in the novel compositions of the present invention are in general condensation products of alkylene oxides having from two to three carbon atoms with a variety of other compounds. The polyoxyalkylene chain in such agents can contain from three to 60 or more oxyalkylene units. Among those which are suitable are ethylene oxide condensates with an alkylphenol such as the alkylphenoxypolyalkoxyalkanols having alkyl groups of about seven to 12 carbon atoms which include heptylphenoxypolyethoxyethanols, octylphenoxypolyethoxyethanols, methyloctylphenoxypolyethoxyethanols, nonylphenoxypolyethoxyethanols and dodecylphenoxypolyethoxyethanols. Other nonionic surfactants are the condensation products of ethylene oxide with a fatty alcohol such as tridecanol polyoxyethylene ether, the condensation products of ethylene oxide with long chain alkylmercaptans such as dodecapolyoxyethylene thioether, the condensation products of ethylene oxide with long chain fatty acids such as the polyoxyethylene ester of lauric acid, the condensation products of ethylene oxide with long chain fatty acid amides or the condensation products of ethylene oxide with partial fatty acid esters of a polyhydroxy compound such as sorbitol, for example, the lauric ester of sorbitan polyoxyethylene ether, the condensation products of ethylene oxide with a hydrophobic base formed by condensing propylene oxide with propylene glycol, the condensation products of ethylene oxide itself. It will be understood, of course, that the propylene oxide may be used in part or completely in place of ethylene oxide in many of these compounds to give a nonionic surface active agent. The alkylphenoxypolyalkoxyalkanols are the preferred nonionic surface active agents employed as additives for the polyolefins.

Anionic surface active agents useful for the purposes of this invention include alkali metal salts of alkylarylsulfonates, alkylarylpolyethersulfonates, alkylnaphthalene sulfonates, wherein the alkyl group contains one to 18 carbon atoms, higher fatty alcohol sulfates having eight to 18 or more carbon atoms, sulfated monoglycerides and esters of sodium sulfosuccinic acid. Representative anionic surfactants are sodium decylbenzenesulfonate, sodium dodecylbenzenesulfonate, sodium alkylnaphthalene sulfonate, the sodium salt of sulfonated monoglycerides of cocoanut fatty acids, the sodium salt of t-octylphenoxyethoxyethoxysulfonate, sodium oleyl sulfate and sodium lauryl sulfate. Preferred alkali metal salts are the sodium, potassium and ammonium salts.

Suitable cationic surface active agents include the long chain quaternary ammonium salts such as cetyltriethylammonium chloride, cetyldimethylethylammonium bromide, cetylpyridinium chloride, dodecyldimethylbenzylammonium chloride, dodecyltrimethylbenzylammonium chloride, stearyldimethylbenzylammonium chloride and octadecyltrimethylammonium chloride. The surface active agents useful in this invention are known compounds and are described in *Surface Active Agents and Detergents*, Volume II, pages 25–143, by Schwartz Perry and Berch, Interscience, Inc., New York (1958). The technical descriptions of the aforementioned text are hereby incorporated by reference into this disclosure.

In addition to being compatible, the surface active agent employed should not volatilize significantly during the fabrication of the polyolefin and hence surface active agents having a boiling point above the fabrication temperature of the polyolefin are preferred where the polyolefin is fabricated in contact with the atmosphere. In enclosed fabrication systems, such as injection molding, this is not a critical limitation since the polymer is released from the mold only after being cooled significantly below its melting or softening point. It will be apparent, furthermore, that the surface active agent employed should not degrade to any significant extent at the fabrication temperatures employed for the polyolefin since such degradation destroys the effectiveness of the surface active agent. However, some degradation is not detrimental since such can be compensated for by excess detergent and since any discoloration normally resulting from the degradation will not be apparent in the plated product.

In a preferred embodiment of the present invention, the polyolefin is modified for electroplating applications by employing the surface active agent additive in combination with a compatible sulfur compound. Sulfur compounds which are compatible with the polyolefin in the above-indicated concentration ranges are generally compounds in which the sulfur is bonded to two methylene groups or similar hydrocarbon moieties. Thioalkanoic acid esters in which the sulfur is also bonded to a hydrocarbon radical and particularly diesters of thiodialkanoic acids constitute the preferred additives employed in combination with the surface active agent to form the polyolefin compositions of the present invention. The dialkylthiodialkanoates which are compatible with the polyolefin are also well-known antioxidants for polyolefins. However, when used as antioxidants, the compounds are employed in generally lower concentrations than in the present invention. Specific examples of sulfur compounds useful as additives in the polyolefins of the present invention include dilauryl thiodipropionate and distearyl thiodipropionate.

The polyolefins modified by the addition of the compatible surface active agent comprise in general all polymers obtained by the addition polymerization of a hydrocarbon containing terminal ethylenic unsaturation. Although vinyl aromatic polymers can be improved for electroplating by using the above described additives, the polyolefins preferably employed comprise polymers which contain a major proportion (i.e., greater than 50 percent of an aliphatic olefin, having from two to eight carbon atoms. Such polyolefins, therefore include polyethylene, polypropylene (particularly solid, substantially crystalline polypropylene), ethylene-propylene copolymers (including random amorphous ethylene-propylene copolymers as well as solid, substantially crystalline block copolymers of propylene and ethylene), ethylene butene-1 copolymers, polybutene-1, poly(4-methylpentene-1), poly(3-methylbutene-1), and the like. The term polyolefin as used herein is, furthermore, intended to include copolymers of hydrocarbon monomers with copolymerizable polar monomers in which such functional monomers constitute a minor proportion of the copolymer. Functional monomers frequently employed in combination with hydrocarbon monomers are in particular the acrylic monomers such as methyl methacrylate, ethyl acrylate and acrylonitrile and the vinyl esters such as vinyl acetate. The modified polyolefin compositions of the present invention, furthermore, can contain inert inorganic fillers such as asbestos fibers, glass fibers, titanium dioxide, carbon, silica, talc and alkaline earth salts which are frequently added to improve the rigidity of the polyolefin. In addition, the polyolefin compositions of the present invention can contain other additives normally added to the polyolefin in order to improve fabricability or solid state properties of such polyolefin.

The compositions of the present invention are formed by methods heretofore employed for the addition of modifiers to a polyolefin. Such methods generally involve melt blending of the polymer and the additive in equipment such as extruders, stirred mixers of milling rolls. However, other methods of distributing additives in the polyolefin are not intended to be excluded. In blending the additives with the polyolefin, the same precautions against degradation of a polymer and additive heretofore practiced should also be observed in the formulation of the compositions of the present invention.

The modified polyolefins of the present invention are shaped into the article desired to be electroplated by any of the means heretofore employed for the preparation of such articles inclusive of which are compression molding and injection molding.

Although a variety of processes have been developed for the electroplating of nonconductive surfaces and in particular plastics, the same general steps are usually employed. Thus, the plating of particles made from the modified polyolefins of the present invention is generally conducted using the following steps:

1. The surface to be plated is cleaned using a mild alkaline bath to remove oils, mold release agents, and fingerprints.
2. The alkaline material retained by the surface is neutralized using a mild acid.
3. The clean surface is then chemically etched with a conditioner containing concentrated mineral acid such as sulfuric acid and chromic trioxide or a chromate.
4. The resulting etched surface is sensitized with a readily oxidizable tin salt solution such as stannous chloride which causes tin to be absorbed on the surface.
5. The surface is then activated or nucleated by treatment with an aqueous solution of a noble metal salt such as palladium chloride which forms a metallic film at discrete activated sites.
6. The activated surface is subjected to electroless plating using copper, nickel, or cobalt as the metal. This is accomplished by immersing a treated surface in a solution of such metal salt containing in addition to the metal salt such as copper sulfate or nickel chloride, a reducing agent such as formaldehyde, trioxymethylene and the like. Sufficient copper, nickel or cobalt is deposited on the surface of the polyolefin article to achieve a continuous coating capable of conducting electricity.
7. The electrodeposition of metal is then followed by conventionally plating of the surface with copper, nickel and/or chromium or just nickel and chromium. The thickness of the electroplated coating is generally within the range of 0.1 to 1.5 mils.

It is, furthermore, highly desirable if not essential to rinse and clean the surface being treated with water between each of the steps outlined and in some instances, it may also be desirable to dry the surface between the various treating steps. Since the various outlined steps employed in the electroplating of nonconducting surfaces and particularly plastic surfaces are well known in the electroplating art, no further description is deemed necessary for a full understanding of the present invention. The polyolefin compositions of the present invention can be employed in electroplating using any of the processes heretofore developed for electroplating of plastic and particularly polyolefin surfaces.

The polyolefin compositions of the present invention are as indicated particularly suitable in the electroplating of articles made from the composition in that they give rise to a greatly improved bond strength between the metal plate and the polyolefin substrate. Although the adhesion of metal plate to the substrate can be measured by various tests, bond strength is preferably measured by the pull test in which two parallel cuts are made into the plated metal coating, one-half -inch apart, an additional vertical cut is made to form a tab, one end of the resulting tab then being raised sufficiently to allow gripping by a tensile testing machine; the specimen is then placed into a tensile rig and the tab is pulled vertically from the surface. The force required to pull the tab is measured as the bond strength.

To successfully practice the invention described herein, the surfactant must be incorporated into the polyolefin to obtain a modified polyolefin composition. If the surfactant is added to the acidic conditioning bath of the electroplating process, intensive oxidation occurs which deactivates and essentially destroys the effectiveness of the conditioner. For instance, when a nonionic surfactant such as t-octylphenoxypolyethoxyethanol having an average of nine to 10 ethoxy units was added to the acidic conditioning bath at 88° C., vehement oxidation occurred as well as excessive foaming. Thus, the conditioning bath was ineffective for chemical etching of the molded polyolefin article.

The present invention is further illustrated by the following examples in which all parts and percentages are by weight unless otherwise indicated.

EXAMPLE 1

To 100 parts of crystalline polypropylene having a flow rate of 3.4 (ASTM-D-1238-62T) is added 0.5 parts of "Triton" X-100, a commercially available nonionic detergent of iso-octylphenoxypolyethoxyethanol having an average of nine to 10 ethoxy units. The polymer is melt blended in an extruder causing the additive to be uniformly distributed throughout the polypropylene. The modified polypropylene is then molded into 3 × 2inch × 110 mil plaques which are electroplated by the following process.

The plaques are immersed consecutively in a conditioner consisting of 40 percent sulfuric acid (96 percent concentration), 39.5 percent phosphoric acid (85 percent concentration), 3 percent chromium trioxide and 17.5 percent of water to which has been added, per liter of conditioner, 36 g. of an additive containing 64 percent of chromium trioxide and 36 percent of sodium hydrogen sulfate, for a period of 10 minutes at 85° C; in a stannous chloride sensitizer solution containing per liter of solution 10 g. of $SnCl_2$ and 40 ml. of HCl at ambient temperatures for 1 to 3 minutes; in an activator solution containing per gallon of solution 1 g. of palladium chloride and 10 ml. of HCl for a period of 1 to 2 minutes at ambient temperatures; and in an electroless copper plating solution containing per liter of solution 29 g. of copper sulfate, 140 g. of Rochelle Salt, 40 g. of sodium hydroxide and 166 g. of formaldehyde (37 percent solution) at a temperature of 70° C. for a period sufficient to obtain a continuous coating capable of conducting electricity. Between each of the immersions described, the plaque is thoroughly rinsed with distilled water. The resulting plaque on washing with water is then electroplated with copper for about 20 minutes, at a current density of approximately 30 amps/sq. ft., resulting in a 1 mil coating of copper on the plaque. A bond strength of 5.3 lbs./in. is obtained.

In the absence of the nonionic surface active agent using the described electroplating technique, the bond between the polypropylene substrate and the copper plate is not strong enough to obtain significant measurement of bond strength, i.e., less than 1 lbs./in.

EXAMPLE 2

The procedure of Example 1 is repeated using a thermally stabilized crystalline polypropylene having a flow rate of 4 and also containing 0.15 parts of calcium stearate as a mold release agent and using as the modifier 0.5 parts of dilauryl thiodipropionate and 0.5 parts of "Triton" X-100. The bond strength of the copper-plated plaques is in the range of 13 to 6 lbs./in.

Substantially similar results are obtained when distearyl thiodipropionate is employed instead of dilauryl thiodipropionate.

EXAMPLE 3

A thermally stabilized crystalline polypropylene having a flow rate of 4 and containing 0.5 parts of "Triton" X-100 and 25 percent of talc is prepared and electroplated by the procedure of Example 1. The bond strength of the metal plate is 17 lbs./in.

EXAMPLE 4

To 100 parts of a crystalline polypropylene homopolymer having a flow rate of 4.0 (ASTM-D-1238-62T) and containing 0.1 percent of 2,6-ditertiarybutyl 4-methyl phenol, 0.1 percent of calcium stearate and 0.5 percent of dilauryl thiodipropionate is added 0.5 parts of a nonionic surfactant of t-octylphenoxypolyethoxyethanol having about five ethoxy units. The polymer is melt blended according to the procedure of Example 1 and thereafter molded into plaques which are electroplated according to the procedure of Example 1 except that the temperature of the conditioning bath was 88° C., and the conditioning bath additionally contained 3 percent, based on the volume of the conditioning bath, of a commercially available mineral spirit having a boiling point of 159°-193° C. and consisted predominantly of $C_{11}C_{15}$ cycloparaffins, and the plaques were immersed in the conditioner for a period of 15 minutes. Evaluation of the bond strength gave a value of 27 lbs./in.

The same electroplating procedure was repeated with the exception that the plaque was immersed in the conditioning bath for 5 minutes and another plaque for a period of 10 minutes. The bond strength of the plaque immersed in the conditioning bath for 5 minutes was 9 lbs./in. and a value of 16 lbs./in. was obtained for the plaque immersed for 10 minutes.

Example 5

The entire procedure of Example 4 was repeated except that the nonionic surfactant was t-octylphenosypolyethoxyethanol having about 60 ethoxy units. Molded plaques were electroplated after immersion in the conditioning bath for periods of 5, 10 and 15 minutes. Bond strengths of 14 lbs./in., 14 lbs./in. and 27 lbs./in. respectively were obtained.

Example 6

Example 5 was repeated using the same materials except that the nonionic surfactant was t-octylphenoxypolyethoxyethanol having about 40 ethoxy units. Molded plaques were electroplated according to the procedure in Example 4 and the plaques were immersed for periods of 5, 10 and 15 minutes in the conditioning bath. Adhesion values of 13 lbs./in., 17 lbs./in. and 27 lbs./in. respectively were obtained.

EXAMPLE 7

To 100 parts of a crystalline polypropylene homopolymer having a flow rate of 3.4 and containing 0.2 percent of 2,6-ditertiarybutyl 4-methyl phenol, 0.5 percent of dilauryl thiodipropionate and 0.2 percent of calcium stearate are added 1.25 parts of a powdered surfactant of 40 percent t-octylphenoxypolyethoxyethanol having an average of nine to ten ethoxy units and 60 percent calcium carbonate. After blending, plaques were molded and electroplated according to the procedure of Example 4. Bond strengths of 10 lbs./in., 14 lbs./in. and 26 lbs./in. were obtained from electroplated plaques that were immersed for 5 minutes, 10 minutes and 15 minutes respectively in the conditioning bath.

EXAMPLE 8

To 99.5 parts of a crystalline polypropylene homopolymer containing 0.1 percent of 2,6-ditertiarybutyl 4-methyl phenol, 0.5 percent of dilauryl thiodipropionate, 0.2 percent of calcium stearate and 5.0 percent of titanium dioxide is added 0.5 parts of a powdered anionic surfactant comprising the sodium salt of technical lauryl alcohol sulfate. After blending and molding, plaques were immersed in the conditioning bath for a period of 10 minutes and electroplated according to the procedure of Example 4. Bond strengths averaged 18–20 lbs./in.

EXAMPLE 9

Example 8 was repeated except that a solid substantially crystalline propylene-ethylene terminal block copolymer having a flow rate of 4.0 and containing 0.2 percent of 2,6-ditertiarybutyl 4-methyl phenol, 0.5 percent of dilauryl thiodipropionate, 0.2 percent of calcium stearate and 5.0 percent of titanium dioxide was substituted for the propylene homopolymer. Substantially equivalent results were obtained.

EXAMPLE 10

Example 8 was repeated except that the surface active agent was a cationic surfactant comprising cetyltriethylammonium chloride. After blending, molding and electroplating according to the procedure of Example 4, wherein the plaque was immersed in the conditioning bath for 10 minutes, the bond strength was evaluated and similar improved adhesion was obtained.

EXAMPLE 11

Example 10 was repeated except that the crystalline propylene-ethylene terminal block copolymer of Example 9 was employed. After blending the polymer composition, molded plaques were immersed in the conditioning bath of Example 4 for 10 minutes and thereafter electroplated. Good bond strengths were obtained.

The foregoing examples have illustrated the formation and use of the novel polyolefin compositions of the present invention. It will be apparent that the specifically illustrated procedures can be equally well applied with other polyolefins and modifiers coming within the scope of the present invention. Similarly other electroplating methods are suitably employed with the modified polyolefins of the present invention. The foregoing examples are considered to be illustrative of the invention and it is not intended to limit the scope of the invention thereto, many variations and modifications of the invention disclosed being obvious to those skilled in the art.

The invention claimed is:

1. A process for making an electroplated polyolefin article comprising uniformly distributing throughout the polyolefin from 0.1 to 2 percent by weight of the polyolefin of a surface active agent thermally stable at the fabrication temperatures of the polyolefin and from 0.25 to 1.5 percent by weight of a compatible diester of a thiodialkanoic acid, forming a shaped article from the so-formed composition, and thereafter conditioning, sensitizing, activating, electroless plating and electroplating said shaped article.

2. A process according to claim 1 wherein said surface active agent is selected from the group consisting of nonionic surface active agents, cationic surface active agents and anionic surface active agents.

3. A process according to claim 1 wherein said surface active agent is a nonionic surface active agent.

4. A process according to claim 3 wherein said nonionic surface active agent is an alkylphenoxypolyethoxyethanol having an alkyl group of about seven to 12 carbon atoms and from about five to 60 ethoxy groups.

5. A process according to claim 1 wherein said polyolefin is a propylene polymer.

6. A process according to claim 1 wherein the nonionic surface active agent contains a polyoxyalkylene ether chain and the concentration of the nonionic surface active agent is from 0.25 to 1.0 percent.

7. An electroplated article prepared according to the process described in claim 1.

8. An electroplated article prepared according to claim 1 wherein said polyolefin is propylene polymer.

9. An electroplated article prepared according to claim 1 wherein said polyolefin is polypropylene.

* * * * *